(12) United States Patent
Liu (10) Patent No.: US 10,922,041 B2
(45) Date of Patent: Feb. 16, 2021

(54) WIRELESS SCREEN TRANSMISSION METHOD, EXTENSION DEVICE, AND WIRELESS SCREEN TRANSMISSION SYSTEM

(71) Applicant: GUANGZHOU SHIRUI ELECTRONICS CO. LTD., Guangzhou (CN)

(72) Inventor: Rong Liu, Guangzhou (CN)

(73) Assignee: GUANGZHOU SHIRUI ELECTRONICS CO. LTD., Guangzhou (CN)

( * ) Notice: Subject to any disclaimer, the term of this patent is extended or adjusted under 35 U.S.C. 154(b) by 400 days.

(21) Appl. No.: 16/094,941

(22) PCT Filed: Jun. 14, 2016

(86) PCT No.: PCT/CN2016/085709
§ 371 (c)(1),
(2) Date: Oct. 19, 2018

(87) PCT Pub. No.: WO2016/202238
PCT Pub. Date: Dec. 22, 2016

(65) Prior Publication Data
US 2019/0129681 A1  May 2, 2019

(30) Foreign Application Priority Data
Jun. 16, 2015  (CN) .......................... 2015 1 0334863

(51) Int. Cl.
*G06F 3/14* (2006.01)
*G06F 3/041* (2006.01)
(Continued)

(52) U.S. Cl.
CPC .......... *G06F 3/1454* (2013.01); *G06F 3/0416* (2013.01); *G06F 3/04883* (2013.01);
(Continued)

(58) Field of Classification Search
CPC ... G06F 3/00; G06F 3/14; G06F 3/041; G06F 3/0416; G06F 3/0488; G06F 3/0632;
(Continued)

(56) References Cited

U.S. PATENT DOCUMENTS

2009/0198839 A1* 8/2009 Banerjee ............... G06F 9/4411
                                                   710/10
2014/0002399 A1* 1/2014 Kambhatla ........... G06F 3/0412
                                                   345/173
(Continued)

FOREIGN PATENT DOCUMENTS

CN         102141882 A        8/2011
CN         102802068 A       11/2012
(Continued)

OTHER PUBLICATIONS

International Application No. PCT/CN2016/113196, International Preliminary Report dated Oct. 30, 2018, 9 pages.
(Continued)

*Primary Examiner* — Robert B Harrell
(74) *Attorney, Agent, or Firm* — Zhong Law, LLC (57) ABSTRACT

A wireless screen transmission method, an extension device, and a wireless screen transmission system are disclosed. The wireless screen transmission method includes: receiving screen display data and audio data captured by a source end device; transmitting the screen display data and the audio data to a touch screen display end over a wireless network, so that the screen display data and the audio data are presented by the touch screen display end; receiving touch data generated by the touch screen display end over the wireless network; and transmitting the touch data to the source end device, so that an operation corresponding to the touch data is performed by the source end device. The present invention further implements returning of touch data from a display end in a wireless manner based on wireless screen transmission, thereby improving flexibility and convenience of operations.

20 Claims, 3 Drawing Sheets

(51) Int. Cl.
*G06F 3/0488* (2013.01)
*H04W 84/12* (2009.01)

(52) U.S. Cl.
CPC ...... *G06F 3/14* (2013.01); *G06F 2203/04104* (2013.01); *G09G 2370/16* (2013.01); *H04W 84/12* (2013.01)

(58) Field of Classification Search
CPC .. G06F 3/0689; G06F 3/1454; G06F 3/04883; G06F 9/4411; G06F 9/4413; G06F 13/00; G06F 13/102; G06F 13/385; G06F 13/409; G06F 13/4027; G06F 13/4072; G06F 13/4086; G06F 15/177; G06F 2203/04104; G09G 2370/16; H04L 12/403; H04L 12/2803; H04L 29/06; H04L 29/08072; H04L 29/08981; H04W 84/12
USPC .............................. 709/208; 710/8, 100, 110
See application file for complete search history.

(56) References Cited

U.S. PATENT DOCUMENTS

| | | | | |
|---|---|---|---|---|
| 2014/0210693 | A1* | 7/2014 | Bhamidipati | H04L 65/4092 345/2.3 |
| 2014/0364119 | A1* | 12/2014 | Bradley | H04W 36/24 455/436 |
| 2015/0109225 | A1 | 4/2015 | Hu | |

FOREIGN PATENT DOCUMENTS

| | | |
|---|---|---|
| CN | 202758595 U | 2/2013 |
| CN | 203164829 U | 8/2013 |
| CN | 104301012 A | 1/2015 |
| CN | 204217085 U | 3/2015 |
| CN | 105045548 A | 11/2015 |
| CN | 105677135 A | 6/2016 |
| CN | 105138262 B | 7/2018 |
| JP | 2008108184 A | 5/2008 |
| JP | 5285186 B2 | 9/2013 |
| WO | 2013008330 A1 | 1/2013 |

OTHER PUBLICATIONS

European Application No. 16900301.9, Extended European Search Report dated Apr. 5, 2019, 13 pages.
Chinese Application No. 201610698125 First Office Action 8 pages.
Chinese Application No. 201610698125 First Search 1 page.
First Office Action for CN Application No. 2015103348637, 16 pages.
International Search Report received in PCT/CN2016/085709 dated Sep. 6, 2016 (5 pages).
Second Office Action for CN Application No. 201510334863.7, 7 pages.
Third Office Action for CN Application No. 201510334863.7, 8 pages.
Written Opinion received in PCT/CN2016/085709 dated Sep. 6, 2016 (11 pages).

* cited by examiner

WIRELESS SCREEN TRANSMISSION METHOD, EXTENSION DEVICE, AND WIRELESS SCREEN TRANSMISSION SYSTEM

CROSS-REFERENCE TO RELATED APPLICATIONS

This application claims priority to International Patent Application No. PCT/CN2016/085709 filed Jun. 14, 2016, which claims priority to Chinese application No. CN 201510334863.7, filed Jun. 16, 2015, the contents of which are hereby incorporated by reference as though fully set forth herein.

TECHNICAL FIELD

The present invention relates to the field of computer information processing technologies and, more particularly, to a wireless screen transmission method, an extension device, and a wireless screen transmission system.

BACKGROUND

Screen transmission technology is primarily implemented to synchronize contents and sounds from a screen of a source end device to display ends such as a projector, a television, a flat panel-for-conference and the like for presentation. The advantage of computers lies in its strong processing capability, simple operations, and ease to access substantial recreation resources such as videos, texts, images and games. But the quality of sound and viewing experience of computers is inferior to those of flat-panel TVs. Wireless screen transmission technology can fully combine the advantages of both computers and flat-panel TVs.

However, in general, the existing screen transmission scheme can only make one directional transmission of audio and video signals from a source end device to a display end, while the signal at the display end device cannot transmit to the source end device. This may negatively impact the performance of a PowerPoint™ (PPT) presentation and reduces efficiency when the PPT presentation is implemented by using the display end device, since a presenter would inevitably need to walk between the source end device and the display end when the presenter needs to control the PPT through the source end device.

In order to achieve the function of controlling displaying contents of the source end device from the display end device, a conventional flat panel-for-conference transmits video signals via VGA, HDMI and the like, and uses a USB cable connecting the flat panel-for-conference and the source end device to return touch data to the source end device. However, this solution requires the additional USB cable for wired transmission of the returning signal, and the arrangement of a computer as well as the display end device is also limited by the USB cable, and therefore, the convenience is considerably reduced by the complicatedness of operations.

SUMMARY

A technical problem to be solved by the present invention is to provide a wireless screen transmission method, an extension device and a wireless screen transmission system to implement wireless return transmission of touch data from a display end device, thereby improving flexibility and convenience of operations.

To address the above technical problem, the present invention provides a wireless screen transmission method, including:

receiving screen display data and audio data captured by a source end device;

transmitting the screen display data and the audio data to a touch screen display end over a wireless network to present, by the touch screen display end, the screen display data and the audio data are presented;

receiving touch data generated by the touch screen display end over a wireless network; and transmitting the touch data to the source end device, where an operation corresponding to the touch data is performed by the source end device.

The touch data includes one or more of a quantity, a state, a coordinate or a pressure value of a touch point.

In a preferred embodiment, the method further includes:

detecting whether the screen display data contains a presentation of a preset type of file; if yes, receiving a gesture signal transmitted from the touch screen display end over a wireless network; where the gesture signal is obtained by the touch screen display end through gesture recognition to the touch data;

transmitting the gesture signal to the source end device, and executing, by the source end device through a simulated key event of an operating system, an operation corresponding to the gesture signal.

In another preferred embodiment, the method further includes:

detecting whether the screen display data contains a presentation of a preset type of file; if yes, receiving a gesture signal transmitted from the touch screen display end over a wireless network; where the gesture signal is obtained by the touch screen display end through gesture recognition to the touch data;

acquiring a key event corresponding to the gesture signal, transmitting the key event to the source end device over a keypad protocol, responding to the key event by the source end device.

Preferably, the preset type of file is PPT.

The present invention further provides an extension device, including:

a first receiving module, configured to receive screen display data and audio data captured by a source end device;

a first transmitting module, configured to transmit the screen display data and the audio data to a touch screen display end over a wireless network, where the screen display data and the audio data are presented by the touch screen display end;

a second receiving module, configured to receive touch data generated by the touch screen display end over a wireless network; and a second transmitting module, configured to transmit the touch data to the source end device, where an operation corresponding to the touch data is performed by the source end device.

Where the touch data includes one or more of a quantity, a state, a coordinate or a pressure value of a touch point.

Preferably, the coordinate of the touch point is calculated as follows:

performing linear scaling according to a size of the screen display data displayed in a display area of a touch screen display end, and calculating the coordinate of the touch point.

In a preferred embodiment, the extension device further includes:

a detecting module, configured to detect whether the screen display data contains a presentation of a preset type of file;

a third receiving module, configured to receive a gesture signal transmitted from the touch screen display end over a wireless network when the screen display data contains the presentation of the preset type of file; where the gesture signal is obtained by the touch screen display end through gesture recognition to the touch data; and a third transmitting module, configured to transmit the gesture signal to the source end device, where an operation corresponding to the gesture signal is performed by the source end device through a simulated key event of an operating system.

In another preferred embodiment, the extension device further includes:

a detecting module, configured to detect whether the screen display data contains a presentation of a preset type of file;

a third receiving module, configured to receive a gesture signal transmitted from the touch screen display end over a wireless network when the screen display data contains the presentation of the preset type of file; where the gesture signal is obtained by the touch screen display end through gesture recognition to the touch data; and a third transmitting module, configured to acquire a key event corresponding to the gesture signal, transmitting the key event to the source end device over a keypad protocol, where the source end device responds to the key event is responded.

The present invention further provides a wireless screen transmission system, including a source end device, an extension device and a touch screen display end;

the source end device includes a capturing module and a performing module; the extension device includes a first receiving module, a second transmitting module, a first transmitting module and a second receiving module; the touch screen display end includes a presenting module and a touch data acquisition module;

the capturing module, configured to capture screen display data and audio data from the source end device and transmit to the extension device;

the first receiving module, configured to receive the screen display data and the audio data;

the first transmitting module, configured to transmit the screen display data and the audio data to the touch screen display end over a wireless network;

the presenting module, configured to present the screen display data and the audio data;

the touch data acquisition module, configured to acquire touch data generated by the touch screen display end and transmit to the extension device;

the second receiving module, configured to receive the touch data over a wireless network;

the second transmitting module, configured to transmit the touch data to the source end device;

the performing module, configured to perform an operation corresponding to the touch data.

The present invention provides the following advantages over the prior art:

The present invention provides a wireless screen transmission method, an extension device, and a wireless screen transmission system. The extension device is externally connected to a source end device. By transmitting, through the extension device, screen display data and audio data from the source end device to a touch screen display end for display in a wireless manner, a function of wireless screen transmission can be achieved. And by returning touch data from the touch screen display end to the source end device over the wireless network, touch operations on the source end device may be performed by using the touch screen display end, thereby improving flexibility and convenience of operations.

DESCRIPTION OF EMBODIMENTS

For a more complete understanding of the technical solutions of the present invention, detailed description of the embodiments of the present invention will be set forth in conjunction with the accompanying drawings. It should be apparent that the embodiments described herein are only a part of embodiments of the present invention, and are not all of embodiments thereof. Reference numbers for each step in the embodiments are only for purposes of illustration, and are not to be construed as limiting the order for performing the steps. All other embodiments obtained by persons of ordinary skill in the art based on the embodiments of the present invention without creative efforts shall fall within the protection scope of the present invention.

Figure 1:
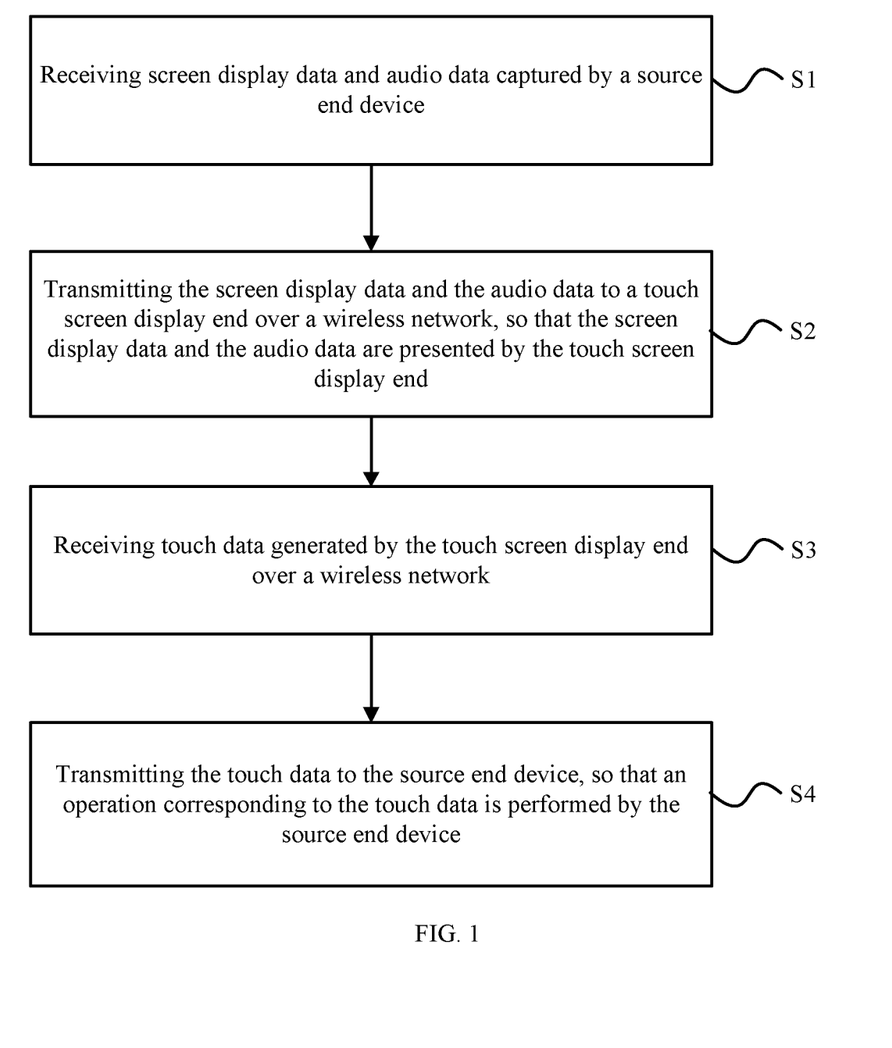
FIG. 1 is a flowchart of an embodiment according to a wireless screen transmission method of the present invention.

FIG. 1 is a flowchart of an embodiment according to a wireless screen transmission method of the present invention.

The wireless screen transmission method includes steps S1-S4:

S1: receiving screen display data and audio data captured by a source end device.

In a particular embodiment, an extension device is a USB dongle, where the extension device is configured with a USB interface module, a Microprocessor Unit (MPU), a wireless communication module, a random access memory (RAM), a NAND FLASH, a push button and an indicator. The extension device may be connected to the source end device through a USB interface. Although in the following embodiments a computer is used as the source end device; however, those skilled in the art should understand that the source end device may be a computer, a mobile phone, a tablet and the like, which is not limited in the present invention, and may be selected by those skilled in the art according to actual requirements. The extension device may be connected to a flat panel-for-conference (a touch screen display end) through the wireless communication module. Preferably, the wireless communication module is a Wireless-Fidelity (WIFI) module, where the extension device establishes a socket network connection with the flat panel-for-conference via WIFI. After the extension device is inserted into the source end device, the source end device may run an application (APP) automatically, capture current screen display data and audio data by using the application and transmit the screen display data and the audio data to the extension device.

S2: transmitting the screen display data and the audio data to a touch screen display end over a wireless network, where the screen display data and the audio data are presented by the touch screen display end.

In a particular embodiment, the extension device forwards the screen display data and the audio data received from the source end device to a flat panel-for-conference, and the flat panel-for-conference decodes and presents the received audio/video data.

S3: receiving touch data generated by the touch screen display end over a wireless network.

In a particular embodiment, the touch screen display end monitors touch events by running an application, acquires generated touch data when a touch event occurs, packs the touch data according to a preset format and transmits the packed touch data to the extension device, where the touch data includes one or more of a quantity, a state, a coordinate or a pressure value of a touch point. The coordinate of the touch point includes a horizontal axis coordinate x and a longitudinal axis coordinate y. Due to the resolution difference between the touch screen display end and the source end device, the coordinate of the touch point may be calculated according to the following method in the practical application: performing linear scaling according to a size of the screen display data displayed in a display area of the touch screen display end, thereby achieving a matching between a touch position and a display position. For example, the resolution of the touch screen display end is 1000*500, and the resolution of the source end device is 500*500, when the touch screen display end is presenting screen display data of the source end device, the display area of the touch screen display end is the region of 500*500 in the middle of the screen, and a black bar of 250*500 will appear on both sides of the screen. Setting the upper left corner of the touch screen display end as the origin of coordinate, if the current coordinate of the touch point on the touch screen display end is (250, 0), the actual position of the click is corresponding to the point (0, 0) on the source end device, where the coordinate conversion may be calculated through linear scaling.

S4: transmitting the touch data to the source end device, where the source end device may perform an operation corresponding to the touch data.

In a particular embodiment, upon receiving the touch data, the extension device unpacks the touch data, and then re-encapsulates the touch data according to the USB HID (Human Interface Device) multi-touch protocol, and transmits the touch data in USB HID multi-touch format to the source end device through a USB interface. Since the extension device adopts a standard USB HID protocol for touch devices, the source end device receives and converts the touch data to a touch event and transmits the touch event to an operation system, responding to the touch event through the source end device, thereby enabling performing operations on the source end device through the flat panel-for-conference.

In a preferred embodiment, the wireless screen transmission method further includes steps S5 and S6.

S5: detecting whether the screen display data contains a presentation of a preset type of file; if yes, receiving a gesture signal transmitted from the touch screen display end over a wireless network; where the gesture signal is obtained by the touch screen display end through gesture recognition to the touch data.

In a particular embodiment, detecting whether the screen display data contains a presentation of a preset type of file by an Application Programming Interface (API) interface of the source end device, where preferably the preset type of file is PPT. Specifically, monitoring whether the PPT software is running through the API interface to determine whether the source end device is currently playing PPT. If it is detected that the source end device is playing PPT, instead of returning the touch data directly, performing gesture recognition to the touch data and transmitting an identified gesture signal to the extension device by a software of the touch screen display end.

S6: transmitting the gesture signal to the source end device, where an operation corresponding to the gesture signal is performed by the source end device through a simulated key event of an operating system.

In a particular embodiment, the extension device forwards the gesture signal to the source end device through a USB interface upon receiving the gesture signal identified by the touch screen display end. The source end device may find an operation corresponding to the gesture signal using a look-up table and perform the operation. For example, when the gesture signal is a left stroke, the corresponding operation is to flip back a PPT slide. The corresponding relation between a gesture signal and a specific operation may be defined as desired, which is not limited in the present invention.

In another preferred embodiment, the wireless screen transmission method further includes steps S51 and S61.

S51: detecting whether the screen display data contains a presentation of a preset type of file; if yes, receiving a gesture signal transmitted from the touch screen display end over a wireless network; where the gesture signal is obtained by the touch screen display end through gesture recognition to the touch data. The step S51 is the same as the above step S5, reference may be made to the related description in S5, which is not repeated herein in detail.

S61: acquiring a key event corresponding to the gesture signal, transmitting the key event to the source end device based on a keypad protocol, where the source end device responds to the key event.

In the present embodiment, upon receiving a gesture signal identified by the touch screen display end, instead of transmitting to the source end device directly, the extension device encapsulates the gesture signal according to the keypad protocol and transmits the encapsulated gesture signal to the source end device. The extension device directly transmits the key event to the source end device in a manner of USB HID keypad, and the source end device directly performs a key operation.

The above two embodiments achieves an automatic switching of the PPT mode, enabling performing operations on the PPT of the source end device through a gesture function, thereby effectively avoiding incorrect operations, which helps improving user experiences.

Furthermore, in a particular embodiment, the present invention may also perform an automatic switching of the PPT mode through configurations set by the application of the source end device.

Additionally, in practice a software of the source end device may also be used to set whether to return the touch data, the wireless screen transmission method further includes:

receiving a return control signal transmitted from the source end device, and transmitting the return control signal to the touch screen display end over a wireless network, controlling whether to return the touch data from the touch screen display end according to the return control signal. If a user chooses not to return the touch data, the touch screen display end will not acquire touch data or discard the acquired touch data.

Figure 2:
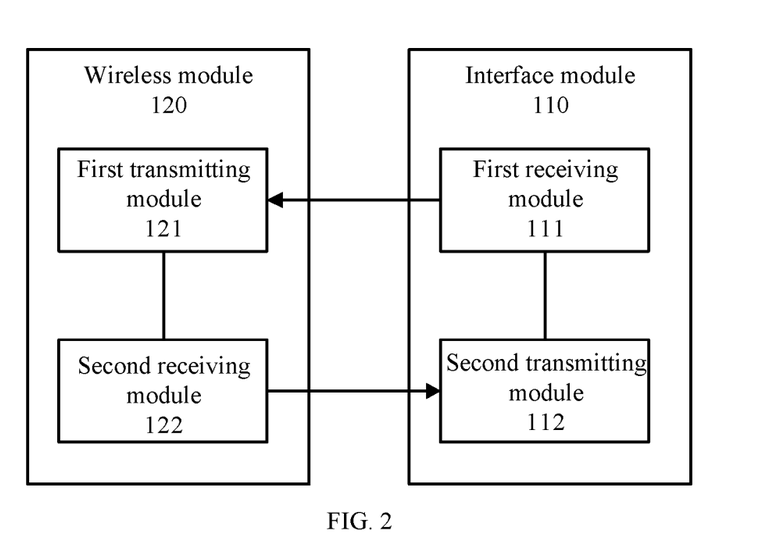
FIG. 2 is a structural diagram of an embodiment according to an extension device of the present invention.

As illustrated in FIG. 2, it is a structural diagram of an embodiment according to an extension device of the present invention. The substance of the extension device according to the present embodiment corresponds to that of the wireless screen transmission method described in the above embodiment, and reference may be made to the related description in the foregoing embodiment.

The extension device includes an interface module 110 and a wireless module 120. In a particular embodiment, the interface module 110 is preferably a USB interface module, and the wireless module 120 is preferably a WIFI module.

The interface module 110 includes a first receiving module 111 and a second transmitting module 112, and the wireless module 120 includes a first transmitting module 121 and a second receiving module 122;

the first receiving module 111, configured to receive screen display data and audio data captured by a source end device;

the first transmitting module 121, configured to transmit the screen display data and the audio data to a touch screen display end over a wireless network, so that the screen display data and the audio data are presented by the touch screen display end;

the second receiving module 122, configured to receive touch data generated by the touch screen display end over a wireless network, where the touch data includes one or more of a quantity, a state, a coordinate or a pressure value of a touch point;

the second transmitting module 112, configured to transmit the touch data to the source end device, where the source end device performs an operation corresponding to the touch data.

In a preferred embodiment, the extension device further includes a detecting module.

The detecting module, configured to detect whether the screen display data contains a presentation of a preset type of file.

The wireless module further includes a third receiving module, and the interface module further includes a third transmitting module.

The third receiving module, configured to receive a gesture signal transmitted from the touch screen display end over a wireless network when the screen display data contains the presentation of the preset type of file; where the gesture signal is obtained by the touch screen display end through gesture recognition to the touch data.

The third transmitting module, configured to transmit the gesture signal to the source end device, so that an operation corresponding to the gesture signal is performed by the source end device through a simulated key event of an operating system.

In another preferred embodiment, upon receiving a gesture signal identified by the touch screen display end, instead of transmitting to the source end device directly, the third transmitting module acquires a key event corresponding to the gesture signal and transmits the key event to the source end device according to a keypad protocol, where the source end device responds to the key event.

Figure 3:
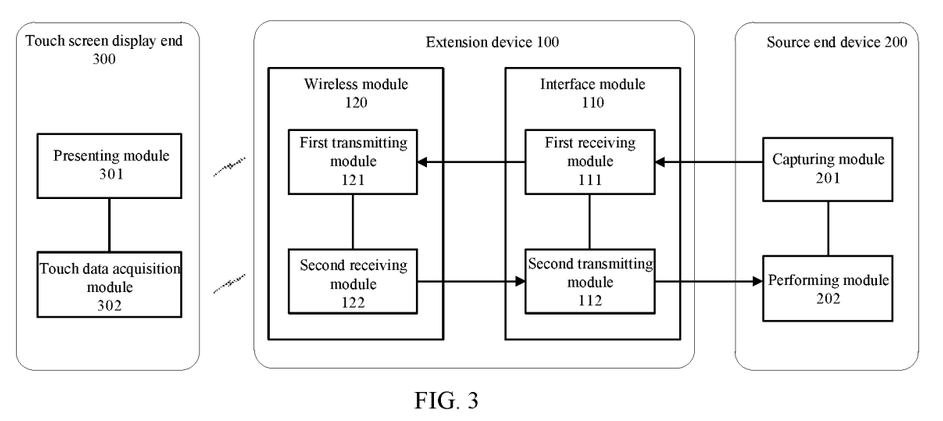
FIG. 3 is a structural diagram of an embodiment according to a wireless screen transmission system of the present invention.

As illustrated in FIG. 3, it is a structural diagram of an embodiment according to a wireless screen transmission system of the present invention. The substance of a wireless screen transmission system according to the present embodiment corresponds to that of a wireless screen transmission method described in the above embodiment, and reference may be made to the related description in the foregoing embodiment.

The wireless screen transmission system includes a source end device 200, an extension device 100 and a touch screen display end 300.

The source end device 200 includes a capturing module 201 and a performing module 202; the extension device 100 includes an interface module 110 and a wireless module 120, where the interface module 110 includes a first receiving module 111 and a second transmitting module 112, and the wireless module 120 includes a first transmitting module 121 and a second receiving module 122; the touch screen display end 300 includes a presenting module 301 and a touch data acquisition module 302.

The capturing module 201, configured to capture screen display data and audio data from the source end device 200 and transmit to the extension device 100.

The first receiving module 111, configured to receive the screen display data and the audio data.

The first transmitting module 121, configured to transmit the screen display data and the audio data to the touch screen display end 300 over a wireless network.

The presenting module 301, configured to present the screen display data and the audio data.

The touch data acquisition module 302, configured to acquire touch data generated by the touch screen display end 300 and transmit to the extension device 100.

The second receiving module 122, configured to receive the touch data over a wireless network.

The second transmitting module 112, configured to transmit the touch data to the source end device 200.

The performing module 202, configured to perform an operation corresponding to the touch data.

In summary, the present invention provides a wireless screen transmission method, an extension device, and a wireless screen transmission system. The extension device is externally connected to a source end device. By transmitting screen display data and audio data from the source end device to a touch screen display end for display in a wireless manner, a function of wireless screen transmission can be achieved. And by returning touch data from the touch screen display end to the source end device over a wireless network, touch operations on the source end device may be performed by using the touch screen display end, thereby improving flexibility and convenience of operations.

The wireless transmission method, the extension device, and the wireless screen transmission system provided by the present invention have been described above in detail. Specific examples are used herein to illustrate the principle and implementation of the interaction of the present invention. The above embodiments are only described for helping to understand the method according to the present invention and its core concept. Meanwhile, those of ordinary skill in the art, based on the idea of the present invention, will have changes in specific embodiments and application ranges. Thus, the contents of the specification should not be construed as a limit to the present invention.

What is claimed is:

1. A wireless screen transmission method, comprising:
receiving screen display data presented on and captured by a source end device for a targeted presentation on a touch screen of a touch screen display end;
transmitting the screen display data to the touch screen display end over a wireless network, wherein the touch screen display end is to present the screen display data;
receiving, over the wireless network, touch data generated by the touch screen display end in a Universal Serial Bus (USB) format in response to actions on the touch screen, wherein the touch data comprises at least one of a coordinate or a pressure of a touch point on the touch screen;

processing the touch data; and transmitting the touch data to the source end device, wherein the source end device is to perform an operation corresponding to the touch data.

2. The wireless screen transmission method according to claim 1, comprising:

receiving a gesture signal from the touch screen display end over a wireless network, wherein the touch screen display end is to obtain the gesture signal through gesture recognition to the touch data; and transmitting the gesture signal to the source end device, wherein the source end device is to use the gesture signal to perform an operation corresponding to the gesture signal.

3. The wireless screen transmission method according to claim 2, wherein the gesture signal is characterized as an operation on a preset type of file, wherein the source end device is to use the gesture signal to perform a flipping back operation on the preset type of file currently displayed on an interface.

4. The wireless screen transmission method according to claim 3, wherein the preset type of file comprises a PowerPoint file.

5. The wireless screen transmission method according to claim 2, wherein the gesture signal is used to trigger the source end device to perform, through a simulated key event of an operation system, an operation corresponding to the gesture signal.

6. The wireless screen transmission method according to claim 2, further comprising:

acquiring a key event corresponding to the gesture signal; and transmitting the key event to the source end device using a keypad protocol, wherein the key event is used for triggering the source end device to respond to the key event.

7. The wireless screen transmission method according to claim 1, wherein the coordinate of the touch point is calculated by performing linear scaling according to a size of the screen display data displayed in a display area of the touch screen display end.

8. The wireless screen transmission method according to claim 7, wherein the coordinate of the touch point comprises a horizontal axis coordinate x and a longitudinal axis coordinate y.

9. The wireless screen transmission method according to claim 1, wherein the touch data further comprises at least one of a quantity or a state of the touch point, wherein processing the touch data comprises re-encapsulating the touch data according to a USB HID multi-touch protocol to obtain the touch data in a USB HID multi-touch format, wherein the source end device is to perform the operation corresponding to the touch data in the USB HID multi-touch format, and wherein transmitting the touch data to the source end device comprises transmitting the touch data in the USB HID multi-touch format to the source end device.

10. The wireless screen transmission method according to claim 1, comprising:

unpacking the touch data to obtain unpacked touch data, wherein the processing the touch data based on the USB HID multi-touch protocol comprises processing the unpacked touch data based on the USB HID multi-touch protocol.

11. The wireless screen transmission method according to claim 1, wherein the source end device comprises a computer, a mobile phone or a tablet, wherein the touch screen display end comprises a flat panel-for-conference, and wherein the wireless network comprises WIFI.

12. The wireless screen transmission method according to claim 1, wherein the coordinate of the touch point is obtained from a coordinate conversion to a coordinate of the screen display data on the touch screen display end.

13. The wireless screen transmission method according to claim 1, comprising:

receiving a return control signal from the source end device; and transmitting the return control signal to the touch screen display end over a wireless network, wherein the touch screen display end is to use the return control signal to control whether to return the touch data.

14. An extension device, comprising:

a first receiving module to receive screen display data presented on and captured by a source end device for a targeted presentation on a touch screen of a touch screen display end;

a first transmitting module to transmit the screen display data to the touch screen display end over a wireless network, wherein the touch screen display end is to present the screen display data;

a second receiving module to receive, over the wireless network, touch data generated by the touch screen display end in a Universal Serial Bus (USB) format in response to actions on the touch screen, wherein the touch data comprises at least one of a coordinate or a pressure of a touch point on the touch screen; and a second transmitting module to:

process the touch data; and transmit the touch data to the source end device, wherein the source end device is to perform an operation corresponding to the touch data.

15. The extension device according to claim 14, further comprising a third receiving module to:

receive a gesture signal from the touch screen display end over a wireless network, wherein the touch screen display end is to obtain the gesture signal through gesture recognition to the touch data; and transmit the gesture signal to the source end device, wherein the source end device is to use the gesture signal to perform an operation corresponding to the gesture signal.

16. The extension device according to claim 15, wherein the gesture signal is characterized as an operation on a preset type of file, wherein the source end device is to use the gesture signal to perform a flipping back operation on the preset type of file currently displayed on an interface.

17. The extension device according to claim 16, wherein the gesture signal is used to trigger the source end device to perform, through a simulated key event of an operation system, an operation corresponding to the gesture signal.

18. The extension device according to claim 14, wherein the touch data further comprises at least one of a quantity or a state of the touch point, wherein to process, the second transmitting module is further to encapsulate the touch data according to a USB HID multi-touch protocol to obtain the touch data in a USB HID multi-touch format, wherein the source end device is to perform the operation corresponding to the touch data in the USB HID multi-touch format, and wherein transmitting the touch data to the source end device comprises transmitting the touch data in the USB HID multi-touch format to the source end device.

19. The extension device according to claim 14, wherein the second transmitting module is further to unpack the touch data to obtain unpacked touch data, wherein the second transmitting module is to process the touch data based on the USB HID multi-touch protocol comprises processing the unpacked touch data based on the USB HID multi-touch protocol.

20. A wireless screen transmission system, comprising:
an extension device; and
a touch screen display end communicatively coupled to the extension device using a wireless network, wherein extension device is to:
receive screen display data presented on and captured by a source end device for a targeted presentation on a touch screen of the touch screen display end;
transmit the screen display data to the touch screen display end over a wireless network, wherein the touch screen display end is to present the screen display data;
receive, over the wireless network, touch data generated by the touch screen display end in a Universal Serial Bus (USB) format in response to actions on the touch screen, wherein the touch data comprises at least one of a coordinate or a pressure of a touch point on the touch screen;
process the touch data; and
transmit the touch data to the source end device, wherein the source end device is to perform an operation corresponding to the touch data.

* * * * *